United States Patent [19]

Seibert et al.

[11] Patent Number: 4,730,877
[45] Date of Patent: Mar. 15, 1988

[54] BRAKE SYSTEM WITH HYDRAULIC BRAKE FORCE BOOSTING AND PEDAL TRAVEL SIMULATOR

[75] Inventors: Wolfram Seibert, Pfungstadt; Norbert Ocvirk, Offenbach am Main; Juergen Schonlau, Niedernhausen, all of Fed. Rep. of Germany

[73] Assignee: Alfred Teves GmbH, Frankfurt am Main, Fed. Rep. of Germany

[21] Appl. No.: 884,194

[22] Filed: Jul. 10, 1986

[30] Foreign Application Priority Data

Jul. 25, 1985 [DE] Fed. Rep. of Germany ....... 3526556

[51] Int. Cl.$^4$ .................... B60T 13/12; B60T 15/06; B60T 8/44
[52] U.S. Cl. .................... 303/52; 188/358; 303/114; 303/119; 303/116
[58] Field of Search .................... 303/113–119, 303/61–63, 10, 92, 110, 111, 50–56; 188/358, 359; 60/545, 547.1, 548, 549–560, 564, 591, 574–578, 582

[56] References Cited

U.S. PATENT DOCUMENTS

| | | | |
|---|---|---|---|
| 3,976,171 | 8/1976 | Belart | 303/52 X |
| 4,015,881 | 4/1977 | Adachi | 303/114 |
| 4,354,714 | 10/1982 | Belart | 303/114 |
| 4,357,055 | 11/1982 | Leiber et al. | 303/52 |
| 4,462,642 | 7/1984 | Leiber | 303/92 X |
| 4,489,989 | 12/1984 | Belart et al. | 303/114 X |
| 4,578,951 | 4/1986 | Belart et al. | 303/119 X |
| 4,653,813 | 3/1987 | Burgdorf | 303/114 X |
| 4,653,814 | 3/1987 | Burgdorf | 303/52 |
| 4,655,511 | 4/1987 | Leiber | 303/50 X |
| 4,687,259 | 8/1987 | Reinartz et al. | 303/52 X |

FOREIGN PATENT DOCUMENTS

| | | |
|---|---|---|
| 3020720 | 12/1981 | Fed. Rep. of Germany . |
| 3035576 | 5/1982 | Fed. Rep. of Germany . |
| 3124755 | 1/1983 | Fed. Rep. of Germany . |
| 3131095 | 2/1983 | Fed. Rep. of Germany . |
| 2084275 | 4/1982 | United Kingdom ................ 303/119 |

*Primary Examiner*—Douglas C. Butler
*Attorney, Agent, or Firm*—James B. Raden; Robert P. Seitter

[57] ABSTRACT

A brake system with hydraulic force boosting comprises a master cylinder (1) and an auxiliary pressure supply system including a hydraulic pump (10), the driving motor (M) of which is actuated when the brake is applied. The pressure in the working chambers (18,19) of the master cylinder (1) results in the re-switching of valve arrangements (2,3) with the result that the controlled auxiliary pressure is applied to the wheel brakes (4–7) in lieu of the master cylinder pressure (1). For pedal travel simulation, a hydraulic cylinder (37) is connected to a work chamber (19), with the piston (38) of the hydraulic cylinder being displaceable against a restoring spring (39) and against the controlled auxiliary pressure. A pressure-controlled multidirectional valve (40) provides for a connection of the auxiliary pressure source.

6 Claims, 1 Drawing Figure

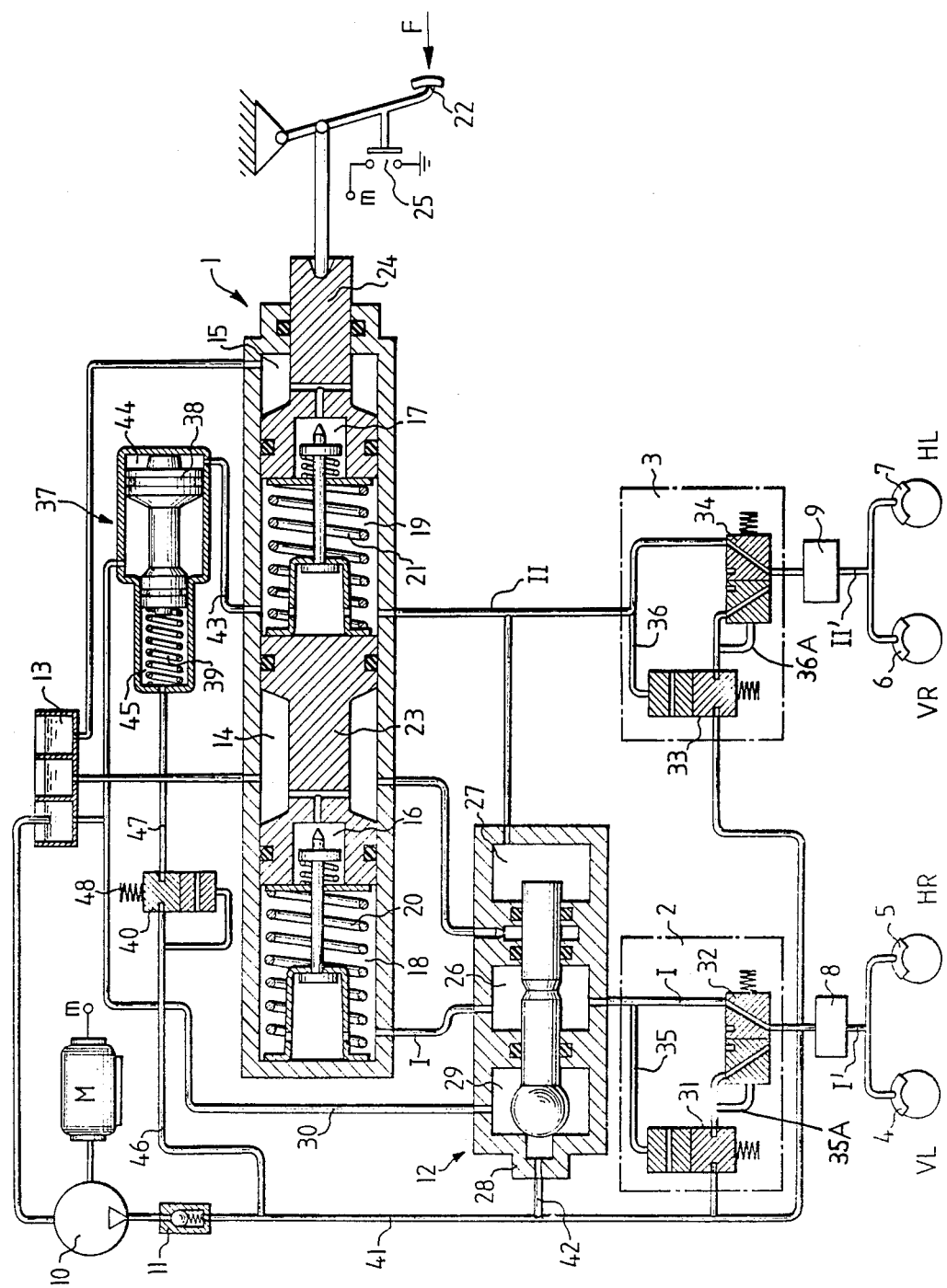

BRAKE SYSTEM WITH HYDRAULIC BRAKE FORCE BOOSTING AND PEDAL TRAVEL SIMULATOR

BACKGROUND OF THE INVENTION

The present invention relates to a brake system with hydraulic brake force boosting for use with motor vehicles. The system comprises a pedal-operated brake pressure generator connected to the wheel brakes by way of pressure fluid conduits, and further comprises an auxiliary pressure supply system and a control valve causing an auxiliary pressure proportional to the pedal force. The system further includes valve arrangements located in the pressure fluid conduits which valves, in one switching position, hydraulically connect the brake pressure generator to the wheel brakes and, after re-switching into a second switching position, connect the auxiliary pressure source in lieu of the brake pressure generator to the pressure fluid conduits leading to the wheel brakes. The system further comprises a pedal travel simulator permitting a travel of the pedal proportional to the pedal force.

Brake systems with a hydraulic brake force boosting of this type are known in the art, which comprise a master cylinder having a hydraulic brake force booster disposed upstream thereof, and which are equipped with an auxiliary pressure suppy system. The brake force booster consists of an auxiliary pressure control valve which, when the brake is applied, causes an auxiliary pressure proportional to the pedal force, which auxiliary pressure is transferred to the pistons in the master cylinder and/or directly, by way of a hydraulic connecting line, to the wheel brakes of a brake circuit. The static circuits of the master cylinder, in such arrangements, provide a pedal travel proportional to the pedal force.

Moreover, a hydraulic brake system has been suggested which, is a normal (i.e., non-defective operating condition) especially with an intact auxiliary pressure supply system, in any braking operation, immediately after actuating the brake pedal, switches over to dynamic pressure control (W. German published application No. P 3502018.0). By actuating the brake pedal, a controlled auxiliary pressure proportional to the pedal force is generated to re-switch pressure-controlled multidirectional valves thereby precluding drain of pressure fluid from the master cylinder and connecting instead the auxiliary pressure source to the wheel brakes. In that system, the master cylinder piston is enabled with the aid of a pedal travel simulator to cover despite the hydraulic blocking a distance in pedal-responsive manner. For that purpose, an additional piston is provided in the master cylinder which is displaceable against spring force. Pedal travel simulators of this type are relatively costly because they require a strong restoring spring permitting the required counter-force and an adequate pedal travel required for fine metering of the braking force.

It is, therefore, the object of the present invention to overcome the afore-described disadvantages by providing a pedal travel simulator suitable for hydraulic brake systems, permitting relatively low manufacturing efforts and compact construction.

SUMMARY OF THE INVENTION

This problem is solved in a simple and technically progressive manner by improving a brake system of the type described wherein the pedal travel simulator comprises a piston disposed in a cylinder. The piston is displaceable by the pressure proportional to the pedal force and arising in the brake pressure generator when the brake is applied, against the force of a restoring spring and in controlled manner, against the auxiliary pressure metered, into the pedal travel simulator from the auxiliary pressure supply system.

Because of the configuration of the pedal travel simulator according to the present invention it is no longer required to generate the force directed against the brake pedal, and permitting an adequate stopping distance, exclusively by means of a relatively strong and voluminous spring. The controlled dynamic pressure of the auxiliary pressure supply system, in the practice of the present invention, will rather be utilized to generate the counter-force. By varying the piston surfaces acted upon by the counter-directed auxiliary pressure proportional to the pedal force, in conjunction with the application of the restoring spring, the desired characteristic and pedal travel simulation can be adjusted in simple manner and can be adapted to individual applications.

According to an advantageous embodiment of the present invention, the pedal travel distance simulator is in the form of a separate hydraulic cylinder hydraulically connected to the brake pressure generator. It comprises a simulator chamber into which can be metered, in controlled manner, a pressure directed against the pedal force and which, by way of a single- or dual-pressure-controlled multidirectional valve, is connected to the auxiliary pressure supply system. Conversely, it is also possible, in the event that a single- or tandem-type master cylinder is provided as the brake pressure generator, to provide the pedal travel simulator in the form of a simulator piston arranged in the master cylinder downstream thereof, which simulator piston is displaceable against the force of the restoring spring and against the auxiliary pressure acting upon the piston at the side facing away from the pedal and metered by way of a pressure-controlled multidirectional valve.

Another advantageous embodiment of the present invention resides in that the pressure-controlled, multidirectional valve is blocked in the resting or initial position and re-switchable to the passage position by means of the auxiliary pressure of the auxiliary pressure supply system. In some cases it may be advantageous if the re-switching of the pressure-controlled multidirectional valve and the operation of the pedal travel simulator caused thereby is dependent on a predetermined pressure threshold value of the auxiliary pressure being exceeded. In place of or in addition to the pressure-controlled multidirectional valves, electrically operated valves can be provided. The switch-over point in time and switching on or off of the pedal travel simulator, in such cases, can be selected in response to any desired criteria.

Preferably, the auxiliary pressure supply system comprises an electrically actuated hydraulic pump capable of being switched on upon actuation of the brake pedal. Brake systems of the type as suggested by the invention can be formed into anti-blocking brake systems and skid-controlled systems, respectively, by additional providing controllable valves in the pressure fluid conduits connecting the brake pressure generator to the wheel brakes and by providing a corresponding control.

Of particular importance is the configuration of the stopping distance simulator as provided by the present invention in conjunction with brake systems which, as long as the auxiliary pressure supply system is intact, are of a purely dynamical action. in an example of embodiment of this type, pressure-controlled multidirectional valves are provided in the pressure fluid conduits between the brake pressure generator and the wheel brakes, which multidirectional valves, in their initial position, hydraulically connect the brake pressure generator to the wheel brakes and which, after re-switching into a second switch position, connect the auxiliary pressure source in place of the brake pressure generator to the pressure fluid conduits leading to the wheel brakes. Only in the event of a failure of the auxiliary pressure supply system, the brake pressure is generated directly by the brake pressure generator; the dynamic brake circuit, in a defective condition, will develop into static brake circuits. In "normal" braking operations, the brake pressure generator will exclusively control the controlled auxiliary pressure directly supplied to the wheel brakes.

BRIEF DESCRIPTION OF THE DRAWING

Various other objects, features and attendant advantages of the present invention will be more fully understood from the following description of one embodiment when taken in connection with the accompanying drawing in which the single FIGURE provides a schematic illustrating the major components of the brake system and the hydraulic circuit diagram.

DETAILED DESCRIPTION

In the embodiment as shown, the brake system of the present invention comprises a brake pressure generator 1 provided in the form of a tandem master cylinder. Connected to the master cylinder, by way of two hydraulically separated brake circuits I,II and by way of valve arrangements 2,3 to be explained in greater detail in the following, are the brake wheels 4–7 of the front and rear wheels VL, HR; VR, HL in diagonal arrangement. Moreover, located in the pressure fluid conduits of both circuits I,I' and II,II' are brake pressure modulators 8,9 capable of controlling, in known manner, the wheel skid to thereby preclude a blocking of the wheels. An illustration of the specific details of the modulators 8,9 is not provided because the skid control is of subordinate importance to the brake system of the invention.

The brake system includes an auxiliary pressure supply system which is composed of a hydraulic pump 10 actuated by an electric motor M, the associated check valve 11 and a brake pressure control valve 12. Moreover, a pressure compensating and pressure fluid reservoir 13 is provided connected to which are the intake side of the pump 10 and chambers 14,15 of the brake pressure generator and the master cylinder 1, respectively by way of which, in conjunction with the central valves 16,17, during releasing of the brake, a pressure equilibrium is established.

The working chambers of the master cylinder to which the brake circuits I,II are connected, are designated by reference numerals 18 and 19, whereas the restoring springs disposed in the said working chambers are designated by reference numerals 20 and 21. When applying the brake in the direction of arrow F, a force is exerted by way of a brake pedal 22, resulting in the displacement of the two master cylinder pistons 23,24 and, hence, in the pressure build-up in the working chambers 18 and 19 after closure of the central valves 16 and 17.

The example as described constitutes a system normally decelerating by dynamic pressure. For, in any actuation of the brakes, the driving motor M of the hydraulic pump 10, by way of a pedal contact 25 and by way of connection m, is operated and the brake pressure control valve 12 actuated. For this purpose, the pressure built up in the working chambers 18,19 of the master cylinder 1 is transferred to the control chambers 26,27 of the auxiliary pressure control valve 12 thereby exerting in proportion to the pedal force a closure pressure on a spherical seat valve 28 of the control valve 12. The previously opened pressure fluid conduit from the hydraulic pump 10, by way of a pressure fluid conduit 41, the connection 42, the valve 28, a valve chamber 29, and by way of a return conduit 30 to the pressure compensating reservoir 13 is thereby throttled so as to build up a controlled pressure proportional to the pedal force F in conduits 41,42.

This controlled auxiliary pressure will result in the switchover of the pressure-controlled multidirectional valves 31,32; 33,34 of the valve arrangements 2,3. For, at the moment presently under consideration which is after the brake having been applied, hydraulic pressure already exists on the control lines 35,36 of the valves 31,33. Both valves 31,33 will thereupon reswitch to the passage position thereby causing, via fluid lines 35A and 36A the 3-way/2-position valves 32,34 to take their second switching position wherein the auxiliary pressure source and the controlled pressure prevailing on the conduit 41, respectively, in lieu of the brake pressure generator 1 by way of modulators 8,9 and brake circuits I',II' is connected to the wheel brakes 4–7.

Because of the re-switch as described to the dynamic brake pressure supply and the blocking of the master cylinder 1 or the brake circuits I,II, respectively, by re-switching of the hydraulically operated 3-way/2-position valves 32,34 even in the event of an increase in the braking force F, any further displacement of the master cylinder piston 23,24 would be precluded. However, a fine metering of the brake force with no displacement of the pedal, that is with no pedal travel proportional to the brake force, would be extremely difficult. The use of this type of brake (so-called "button"-type brakes) is even prohibited in some countries. For this reason, the brake system as shown is provided with a stopping distance simulator 37 which, in this instance, is provided in the form of a separate hydraulic cylinder hydraulically connected to the working chamber 19 of the master cylinder. The hydraulic cylinder includes a piston 38 which is displaceable against the force of a restoring spring 39 and, as soon as a pressure-controlled 2-way/3-position valve 40 is switched over to the passage position, is displaceable against the controlled auxiliary pressure prevailing in the pressure fluid conduits 41,46,47.

In the resting or initial position, the multidirectional valve 40 is held by a low-load spring 48 in the blocking position as shown. If need be, a threshold value can be set by correspondingly dimensioning the spring 48 to determine the pressure at which the valve 40 will re-switch or return to the position as shown.

It is also possible to form the valve 40 as a dual-pressure-controlled valve in which the re-switch is determined by the pressure difference.

The operation of the brake system according to the invention and especially of the stopping distance simulator 37 as described, is easy to understand. The pressure arising in the working chambers 18,19 of the master cylinder 1 when applying the brakes, results in the re-switch of the valve arrangements 2,3 and in an auxiliary pressure in the pressure fluid line 41 and on the input 42 of the control valve 12 proportional to the pedal force F and to the pressure in the chambers 18,19. This is because the pressure fluid passage through the spherical seal valve 28 as a result of the pressure in the chambers 26,27 is reduced in proportion to the pedal force (F). The pressure in the master cylinder chambers 18,19 hence, only serves to control the auxiliary pressure which is now applied to the wheel brakes 4-7 as described.

A displacement of the so-called rod plunger 24 with an increasing pedal force F exerted on the brake pedal 22 is caused by simulator 37 alone. That is, pressure fluid is displaced, by way of pressure fluid conduit 43, into the chamber 44 of the hydraulic cylinder and the pedal travel simulator 37, respectively, with the piston 38 displacing against the restoring spring 39 and, above all, against the controlled auxiliary pressure transferred by way of the pressure fluid conduits 45, the valve 40 and the line 46.

The simulator 37 may take the form of a relatively small and inexpensively produced hydraulic cylinder because the displacement of the piston 38 determining the pedal travel is substantially dependent on the surface ratio of the faces of the piston 38 to which the control pressure and the counter-pressure are applied. The spring 39, above all, serves to restore the piston 38 in the releasing position.

The pedal travel simulator 37 can be provided, as shown, as a separate hydraulic cylinder in communication with the master cylinder 1 by way of a pressure conduit 43 or as an arrangement incorporated into the master cylinder and integrated with the master cylinder piston. Alternatively, the simulator 37 could be connected to the second working chamber 18 of the tandem master cylinder as shown. Also it is possible to establish a connection to both chambers by way of hydraulically separate circuits and the like.

What is claimed is:

1. A dynamic brake system comprising a pedal operated brake pressure generator connected to fluid conduits for providing brake pressure to the wheel brakes of an automotive vehicle, an auxiliary pressure supply system including pump means and control valve means for providing auxiliary fluid pressure proportional to the force operating the pedal operated brake pressure generator, valve means in said fluid conduits, said valve means having a first position for connecting the pedal operated brake pressure generator to the wheel brakes and a second position for connecting the auxiliary pressure supply system to the wheel brakes and for disconnecting the pedal operated brake pressure generator therefrom, and a pedal travel simulator for permitting pedal travel proportional to force operating the pedal operated brake pressure generator, the pedal travel simulator comprising a piston and a cylinder, said cylinder being connected to a pressure chamber in the pedal-operated brake pressure generator so that pressure in the pressure chamber acts on one side of said piston and is proportional to the force operating the pedal operated brake pressure generator, said cylinder also being connected to the auxiliary pressure supply system so that auxiliary fluid pressure acts on the other side of said piston, and a restoring spring in said cylinder acting or the other side of said piston whereby said piston is displaceable by pressure in the brake pressure generator against the force of the restoring spring and the auxiliary fluid pressure.

2. A dynamic brake system in accordance with claim 1 wherein said auxiliary pressure system includes a multi-directional control valve between said pump means and said other end of said piston.

3. A dynamic brake system in accordance with claim 2 wherein the multi-directional control valve is closed when the brake system is inoperative and is switched to its open position by auxiliary fluid pressure from said auxiliary pressure supply system.

4. A dynamic brake system in accordance with claim 2 wherein the multi-directional control valve is closed when the brake system is inoperative and is switched to its open position when the auxiliary fluid pressure in said auxiliary pressure supply system reaches a predetermined value.

5. A dynamic brake system in accordance with claim 1 wherein said pump means becomes operative when an operating force is applied to the pedal operated brake pressure generator.

6. A dynamic brake system in accordance with claim 5 wherein said valve means is in its first position when the brake system is inoperative and is switched to its second position when said pump means becomes operative.

* * * * *